Dec. 30, 1969  M. J. WACLAWEK  3,486,398
TRANSMISSION
Filed Dec. 27, 1967
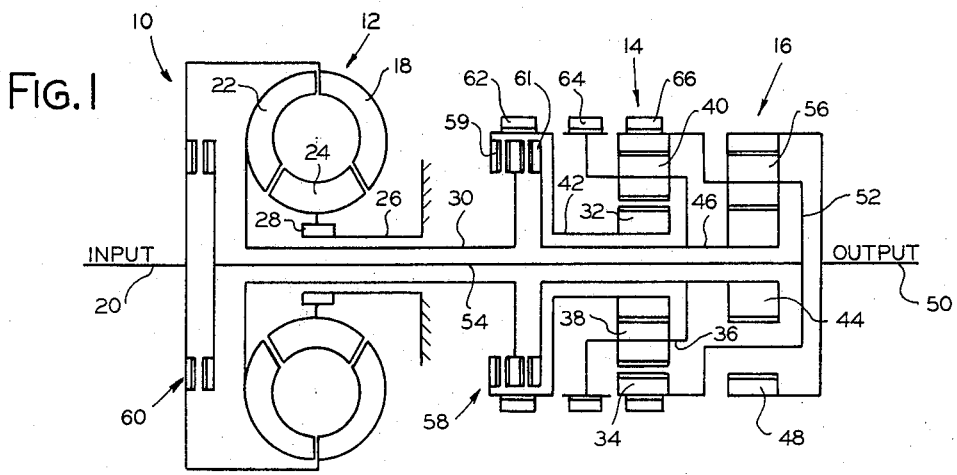
FIG. 1
FIG. 2
|  | REV | 1ST | 2ND | 3RD | 4TH | 5TH | 6TH |
|---|---|---|---|---|---|---|---|
| CLUTCH 59 |  | X |  | X |  | X |  |
| CLUTCH 61 | X |  | X |  |  |  |  |
| CLUTCH 60 |  |  |  |  | X | X | X |
| BRAKE 62 |  |  | X |  | X |  |  |
| BRAKE 64 |  |  |  | X |  |  | X |
| BRAKE 66 | X | X |  |  |  |  |  |
| RATIO | -3.33 | 4.07 | 2.41 | 1.71 | 1.325 | 1.00 | 0.769 |
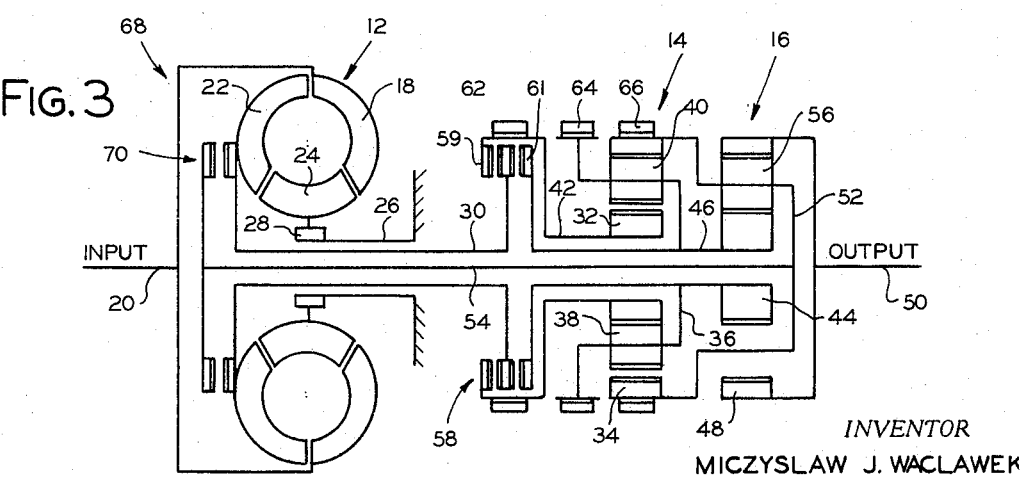
FIG. 3
INVENTOR
MICZYSLAW J. WACLAWEK
BY Robert H Johnson
ATTORNEY United States Patent Office 3,486,398
Patented Dec. 30, 1969

3,486,398
TRANSMISSION
Miczyslaw J. Waclawek, 2913 Garden Drive,
Burlington, Iowa 52601
Filed Dec. 27, 1967, Ser. No. 693,961
Int. Cl. F16h 47/08, 57/10
U.S. Cl. 74—688         10 Claims

ABSTRACT OF THE DISCLOSURE

A transmission having a hydrodynamic torque converter arranged to drive a pair of epicyclic gear sets connected in series. The planet carrier of one gear set is connected to the sun gear of the other gear set to form a unitary assembly and the other planet carrier is connected to the ring gear of the one gear set to form another unitary assembly.

BACKGROUND OF THE INVENTION

The field of art to which this invention relates includes machine elements and mechanisms, and more specifically gearing with plural power paths from an impeller turbine type mechanism to a planetary unit.

A principal object of my invention is to provide a compact, lightweight and inexpensive transmission.

Another object of my invention is to provide a transmission suitable for use in highway trucks or, with a slight modification, suitable for use in off-highway vehicles.

SUMMARY OF THE INVENTION

In carrying out my invention there is provided a first epicyclic gear set and a second epicyclic gear set. Each epicyclic gear set has a sun gear, a ring gear, a planet carrier and planet gear means mounted on the said carrier and in mesh with the sun and ring gears thereof. The planet carrier of the first epicyclic gear set is connected to the sun gear of the second epicyclic gear set to form a unitary assembly and the planet carrier of the second epicyclic gear set is connected to the ring gear of the first epicyclic gear set to form a unitary assembly.

The above and other objects, features and advantages of my invention will be more readily apparent when the detailed description is taken in conjunction with the drawing.

BRIEF DESCRIPTION OF THE DRAWING

FIGURE 1 shows schematically a preferred embodiment of my invention,

FIGURE 2 is a table showing the engagement of the clutches and brakes associated with the embodiment of FIG. 1 to provide the various speed ratios, and FIGURE 3 shows schematically a modification of my invention.

DESCRIPTION OF THE PREFERRED EMBODIMENT

Referring now to FIG. 1, the reference numeral 10 denotes generally a transmission which includes a hydrodynamic torque converter 12 and a pair of epicyclic or planetary gear sets 14 and 16.

Torque converter 12 which serves as input power means includes an impeller 18 which is adapted to be driven by any suitable prime mover, such as an internal combustion or diesel engine, not shown, through an input shaft 20. Torque converter 12 also includes a turbine 22 and a reactor 24 which is connected to a stationary support 26 by means of a one-way brake 28 which permits reactor 24 to overrun or rotate in a forward direction during certain operational modes of torque converter 12. Torque converter 12 is conventional in construction and operation, and, as well-known in the art, fluid which is contained therein transmits power from impeller 18 to turbine 22. Also, it will be noted that turbine 22 is fixed to a sleeve shaft 30.

Epicyclic gear set 14 includes a sun gear 32 which is fixed to a sleeve shaft 42, a ring gear 34, a planet carrier 36 and preferably three sets of dual planet gears disposed equidistantly from each other. Each dual planet gear set includes a gear 38 mounted for rotation on planet carrier 36 and in mesh with sun gear 32 and a planet gear 40 mounted for rotation on planet carrier 36 and in mesh with planet gear 38 and ring gear 34. In regard to the schematic showing of dual planet sets 38, 40 it will be noted that gear 38 is shown rotated approximately 180° out of position relative to planet gear 40. This is done merely for the purpose of clarity and it should be remembered that gears 38 and 40 mesh with each other.

Epicyclic gear set 16 includes a sun gear 44 connected to a sleeve shaft 46 which is telescoped within sleeve shaft 42, a ring gear 48 which is connected to an output shaft 50, a planet carrier 52 fixed to a shaft 54 telescoped within sleeve shafts 30, 42 and 46, and preferably three planet gears 56 disposed equidistantly from each other, mounted for rotation on planet carrier 52 and in mesh with sun gear 44 and ring gear 48.

An important feature of my invention is the connection of planet carrier 36 to sleeve shaft 46, and thus sun gear 44, to form a unitary assembly. It will be apparent that sun gear 44, planet carrier 36 and dual planet gear sets 38, 40 are connected together for conjoint rotation about a common axis.

Another important feature of my invention is that ring gear 34 of epicyclic gear set 14 is connected to planet carrier 52 of epicyclic gear set 16 to form therewith a unitary assembly. Thus, ring gear 34, planet carrier 52 and planet gears 56 are connected together for conjoint rotation about a common axis.

Transmission 10 also includes a dual clutch 58 which has a first portion 59 and a second portion 61. Dual clutch 58 may be actuated to engage portion 59, thereby connecting sleeve shafts 30 and 42 for conjoint rotation, thus driving sun gear 32 from turbine 22 of torque converter 12. Dual clutch 58 also may be actuated to engage connecting sleeve portion 61, thereby shaft 30 to sleeve shaft 46 for conjoint rotation, thus driving sun gear 44 and planet gear sets 38, 40 through turbine 22 of torque converter 12. Also, a clutch 60 is provided which is operable to connect shaft 54 to input shaft 20 for conjoint rotation therewith, whereby planet gears 56 and ring gear 34 are driven directly by input shaft 20. It will be obvious at this point that the epicyclic gear set portion 14, 16 of transmission 10 is provided with three separate power inputs.

Transmission 10 also includes three conventional band brakes 62, 64 and 66 which are associated with epicyclic gear sets 14 and 16. Brake 62 is operable when engaged to hold sun gear 32 from rotation. Brake 64 is operable when engaged to hold the unitary assembly comprising sun gear 44, planet carrier 36 and dual planet gear sets 38, 40 from rotation. Finally, brake 66 is operable when engaged to hold the unitary assembly comprising ring gear 34, planet carrier 52 and planet gears 56 from rotation.

As an example of a transmission designed in accordance with my invention, there is listed below the sun ring gears and the number of teeth employed for each gear.

| Gear: | Number of teeth |
|---|---|
| 32 | 36 |
| 34 | 80 |
| 44 | 24 |
| 48 | 80 |

The foregoing combination of gears provides one reverse speed ratio and six forward speed ratios as set forth in the chart of FIG. 2.

Referring now also to FIG. 2, it will be seen that for a given input at shaft 20 that transmission 10 is conditioned for reverse drive by engaging clutch 61 and brake 66. In order to operate transmission 10 in the first forward speed ratio clutch 59 is engaged together with brake 66. In order to shift to the second speed ratio the clutch and brake that were engaged for first speed ratio are disengaged and in their place clutch 61 and brake 62 are engaged. Similarly, for the third speed ratio the clutch and brake that were engaged for the second speed ratio are released and clutch 59 and brake 64 are engaged. To shift to the fourth speed ratio the clutch and brake which were engaged for the third speed ratio are disengaged and clutch 60 and brake 62 are engaged. In order to shift to the fifth speed ratio it is necessary only to release brake 62 and engage clutch 59 while maintaining clutch 60 engaged. To shift from the fifth to the sixth speed ratio clutch 60 remains engaged, clutch 59 is disengaged and brake 64 is engaged.

It will be noted that in the reverse speed ratio and in the first through third forward speed ratios that all of the power passes through torque converter 12. In the fourth speed ratio the torque converter is bypassed completely and the transmission 10 functions strictly as a mechanical transmission. In the fifth speed ratio there is a split path power flow, part of the power passing through torque converter 12 and part of the power bypassing torque converter 12. Finally, in the sixth speed ratio the torque converter is again bypassed, transmission 10 functioning strictly as a mechanical transmission. This arrangement of a torque converter with a pair of epicyclic gear sets is highly desirable in a highway truck because it provides the advantages of a torque converter in the lower speed ratio ranges and the advantages of a direct mechanical drive in the higher speed ranges.

If it is desired to have a transmission with only four forward speed ratios and one reverse speed ratio, then certain components of the transmission shown in FIG. 1 can be omitted.

In the case where the transmission is modified to have four speeds forward and one speed reverse, the reverse ratio remains the same regardless of whether clutch 59, clutch 60 or brake 64 is omitted. However, there is a change in the forward speed ratios. In the case where clutch 59 is omitted, first speed ratio corresponds to second speed ratio for the six speed transmission, second speed ratio corresponds to four speed ratio, third speed ratio corresponds to the fifth speed ratio, except that it is necessary to engage clutches 60 and 61 to provide this speed ratio, and fourth speed ratio corresponds to the sixth speed ratio. In the situation where clutch 60 is omitted, the forward speed ratios correspond to the speed ratios shown on chart of FIG. 2 as follows: First, second and third speed ratios are the same as the first, second and third speed ratios shown on the chart and the fourth speed ratio corresponds to the fifth speed ratio, except that it is necessary to engage clutches 59 and 61 to provide this ratio. In the situation where brake 64 is omitted, the first and second speed ratios of the four speed transmission correspond to the first and second speed ratios shown on the chart in FIG. 2. The third and fourth speed ratios correspond to the fourth and fifth speed ratios, respectively, shown on the chart of FIG. 2.

It will now be apparent that my invention provides a transmission which is compact and simple, but yet provides a large number of speed ratios. In large part this can be attributed to the fact that sun gear 44 is connected to planet carrier 36 so that the unitary assembly formed therefrom can be held from rotation by brake 64, and further that planet carrier 52 is connected to ring gear 34 to form a unitary assembly which can be held from rotation by brake 66. Of course, each speed ratio is variable through the range of torque converter 12.

Referring now to FIG. 3, there is shown a modification of my invention which is especially suitable for off-highway type applications. Transmission 68 which is shown in FIG. 3 differs from the embodiment shown in FIG. 1 only in that clutch 60 is omitted and replaced by a clutch 70 which is operable to connect shaft 54 to turbine 22 of torque converter 12 for conjoint rotation therewith. The significance of this change in structure is that now torque converter 12 is in the power circuit also in the fourth and sixth speed ratios which is not true with the embodiment shown in FIG. 1.

Although only two embodiments of my invention have been described in detail, it will be understood that such description is illustrative only. Various changes and modifications can be made to my invention without departing from the scope and spirit of it, and so the limits of my invention should be determined from the claims.

I claim:

1. A transmission comprising power input means; a first epicyclic gear set including a first sun gear, a first ring gear, a first planet carrier and at least one double planet gear set mounted on the said planet carrier and meshing with the said first sun and ring gears; a second epicyclic gear set including a second sun gear, a second ring gear which serves as a power output, a second planet carrier and at least one planet gear mounted on the said second planet carrier and meshing with the said second sun and ring gears; the said double planet gear set and second sun gear being connected by the said first planet carrier to form a first unitary assembly; the said planet gear and first ring gear being connected by the said second planet carrier to form a second unitary assembly; first clutch means operable to drivingly connect the said power input means to the said first sun gear; second clutch means operable to drivingly connect the said power input means to the said first unitary assembly; third clutch means operable to drivingly connect the said power input means to the said second unitary assembly; first brake means operable to hold the said first sun gear from rotation; second brake means operable to hold the said first unitary assembly from rotation; and third brake means operable to hold the said second unitary assembly from rotation.

2. A transmission as set forth in claim 1 wherein the said power input means includes a hydrodynamic torque converter having an impeller and a turbine.

3. A transmission as set forth in claim 2 wherein the said first clutch means is operable to drivingly connect the said turbine to the said first sun gear and the said second clutch means is operable to drivingly connect the said turbine to the said first unitary assembly.

4. A transmission as set forth in claim 3 wherein the said third clutch means is operable to drivingly connect the said impeller to the said second unitary assembly.

5. A transmission as set forth in claim 3 wherein the said third clutch means is operable to drivingly connect the said turbine to the said second unitary assembly.

6. A transmission comprising power input means; a first epicyclic gear set including a first sun gear, a first ring gear, a first planet carrier and at least one double planet gear set mounted on the said planet carrier and meshing with the said first sun and ring gears; a second epicyclic gear set including a second sun gear, a second ring gear which serves as a power output, a second planet carrier and at least one planet gear mounted on the said second planet carrier and meshing with the said second sun and ring gears; the said double planet gear set and second sun gear being connected by the said first planet carrier to form a first unitary assembly; the said planet gear and first ring gear being connected by the said second planet carrier to form a second unitary assembly; first clutch means operable to drivingly connect the said power input means to the said first unitary assembly; second clutch means operable to drivingly connect the said power input means to the said second unitary assembly; first brake means operable to hold the said first sun gear from rotation; second brake means operable to hold the said first unitary assembly from rotation; and third brake means operable to hold the said second unitary assembly from rotation.

7. A transmission as set forth in claim 6 wherein the said power input means includes a hydrodynamic torque converter having an impeller and a turbine; the said first clutch means is operable to drivingly connect the said turbine to the said first unitary assembly and the said second clutch means is operable to drivingly connect the said impeller to the said second unitary assembly.

8. A transmission comprising power input means; a first epicyclic gear set including a first sun gear, a first ring gear, a first planet carrier and at least one double planet gear set mounted on the said planet carrier and meshing with the said first sun and ring gears; a second epicyclic gear set including a second sun gear, a second ring gear which serves as a power output, a second planet carrier and at least one planet gear mounted on the said second planet carrier and meshing with the said second sun and ring gears; the said double planet gear set and second sun gear being connected by the said first planet carrier to form a first unitary assembly; the said planet gear and first ring gear being connected by the said second planet carrier to form a second unitary assembly; first clutch means operable to drivingly connect the said power input means to the said first sun gear; second clutch means operable to drivingly connect the said power input means to the said first unitary assembly; first brake means operable to hold the said first sun gear from rotation; second brake means operable to hold said first unitary assembly from rotation; and third brake means operable to hold the said second unitary assembly from rotation.

9. A transmission as set forth in claim 8 wherein the said power input means includes a hydrodynamic torque converter having a turbine, the said first clutch means is operable to drivingly connect the said turbine to the said first sun gear and the said second clutch means is operable to drivingly connect the said turbine to the said first unitary assembly.

10. A transmission comprising power input means; a first epicyclic gear set including a first sun gear, a first ring gear, a first planet carrier and at least one double planet gear set mounted on the said planet carried and meshing with the said first sun and ring gears; a second epicyclic gear set including a second sun gear, a second ring gear which serves as a power output, a second planet carrier and at least one planet gear mounted on the said second planet carrier and meshing with the said second sun and ring gears; the said double planet gear set and second sun gear being connected by the said first planet carrier to form a first unitary assembly; the said planet gear and first ring gear being connected by the said second planet carrier to form a second unitary assembly; first clutch means operable to drivingly connect the said power input means to the said first sun gear; second clutch means operable to drivingly connect the said power input means to the said first unitary assembly; third clutch means operable to drivingly connect the said power input means to the said second unitary assembly; first brake means operable to hold the said first sun gear from rotation; and second brake means operable to hold the said second unitary assembly from rotation.

References Cited

UNITED STATES PATENTS

| 2,353,905 | 7/1944 | Kelley | 74—759 X |
| 2,546,091 | 3/1951 | De Normanville | 74—758 |
| 2,725,762 | 12/1955 | Hettinger et al. | 74—688 |
| 2,762,237 | 9/1956 | Kelbel | 74—688 |
| 2,821,867 | 2/1958 | Kelbel | 74—688 |
| 2,838,960 | 6/1958 | Simpson | 74—759 |
| 3,253,688 | 5/1966 | Livezey | 74—759 X |
| 3,355,967 | 12/1967 | Moan | 74—688 |

DONLEY J. STOCKING, Primary Examiner

THOMAS C. PERRY, Assistant Examiner

U.S. Cl. X.R.

74—730, 759